UNITED STATES PATENT OFFICE.

CHARLES DE LA HARPE, OF BASEL, SWITZERLAND, ASSIGNOR TO THE FIRM OF DYE WORKS, FORMERLY L. DURAND, HUGUENIN & CO., OF BASEL, SWITZERLAND.

PROCESS OF MAKING LEUCOGALLOCYANINS.

No. 863,907.  Specification of Letters Patent.  Patented Aug. 20, 1907.

Application filed May 16, 1907. Serial No. 374,068.

*To all whom it may concern:*

Be it known that I, CHARLES DE LA HARPE, chemist, a citizen of the Swiss Republic, and a resident of Basel, Switzerland, have invented a Process for the Manufacture of the Leucogallocyanin Corresponding to the Pyrogallol, of which the following is a full and exact specification.

I have found that the leuco compound of the gallocyanin derived from nitrosodimethylanilin and gallic acid can be converted into the leucogallocyanin corresponding to the pyrogallol, by heating the said leuco compound, in the form of salts (hydrochlorate, sulfate etc.) or as base, with water at a temperature of about 100° centigrade, in the presence or not of a substance containing an alkali oxid, as for instance sodium acetate, sodium sulfate, or caustic soda lye, under these circumstances carbonic acid being split off from the ordinary leucogallocyanin. This leucogallocyanin corresponding to pyrogallol is easily oxidized to the corresponding pyrogallol-gallocyanin, as a base or as an alkali salt, by the oxygen of the air, or as salt (hydrochlorate, sulfate and the like) by the oxidation of the solution of the salt by means of an oxidizing agent, such as a bichromate, persulfate and the like. The thus obtained oxidized product of the leucogallocyanin corresponding to the pyrogallol is insoluble in sodium carbonate, but is soluble in concentrated hydrochloric acid with a blue coloration.

The following are examples showing how this invention may be carried out.

Example I. 400 liters of water and 30 kilograms of the hydrochlorate of leucogallocyanin obtained by means of the gallocyanin derived from gallic acid and nitrosodimethylanilin, in accordance with the process of the first claim of the United States Letters Patent No. 629666 dated July 25, 1899 or of the process of the English Letters Patent 7835 dated April 12, 1905, are heated in a vat, while being stirred, to the boiling point, this temperature being maintained until the transformation is effected, that is until the solution of the reaction product in hydrochloric acid becomes blue on addition of a little manganese dioxid. The mass is then allowed to cool and the leuco-gallocyanin corresponding to the pyrogallol is salted out.

Example II. Proceed as in example I but in an autoclave instead of an open vat and add to the mass to be treated 13 kilograms of caustic soda lye of 38° Baumé or 10 kilograms of crystallized sodium acetate. The autoclave is then closed and heated to 100° centigrade, until the reaction is completed, that is until the pressure no longer raises. Thirteen kilograms of hydrochloric acid of 21° Bé. are then added to the reaction mass, which is then allowed to cool and the coloring matter is salted out.

Example III. Proceed as in example I, but add a further 40 kilograms of sodium sulfate. After heating the coloring matter is salted out.

The preparation of the leucogallocyanin according to the specified Letters Patent No. 629666 and its transformation into the leucogallocyanin corresponding to the pyrogallol can also be combined in a single operation, that is to say be effected in direct succession.

What I claim is:

1. The process for the manufacture of a leucogallocyanin corresponding to pyrogallol by heating the ordinary leucogallocyanin, corresponding to the gallocyanin derived from nitrosodimethylanilin and gallic acid, with water to about 100° centigrade.

2. The described process for the manufacture of a leucogallocyanin corresponding to pyrogallol by heating the ordinary leucogallocyanin corresponding to the gallocyanin derived from nitrosodimethylanilin and gallic acid, with water in the presence of a substance containing an alkali oxid.

In witness whereof I have hereunto signed my name this 6 day of May 1907, in the presence of two subscribing witnesses.

CHARLES DE LA HARPE.

Witnesses:
 GEORGES CHAPINS,
 AMAND RITTER.